(12) United States Patent
Sotgiu et al.

(10) Patent No.: US 10,828,949 B2
(45) Date of Patent: Nov. 10, 2020

(54) TYRE CHANGING MACHINE

(71) Applicant: Snap-on Equipment S.r.l., Correggio (IT)

(72) Inventors: Paolo Sotgiu, Modena (IT); Lillo Gucciardino, Bomporto (IT); Silvio Manicardi, Carpi (IT); Matteo Neri, Modena (IT)

(73) Assignee: Snap-on Equipment S.r.l., Correggio (IT)

( * ) Notice: Subject to any disclaimer, the term of this patent is extended or adjusted under 35 U.S.C. 154(b) by 225 days.

(21) Appl. No.: 15/774,955

(22) PCT Filed: Apr. 28, 2016

(86) PCT No.: PCT/IB2016/052412
§ 371 (c)(1),
(2) Date: May 9, 2018

(87) PCT Pub. No.: WO2017/081553
PCT Pub. Date: May 18, 2017

(65) Prior Publication Data
US 2018/0370302 A1    Dec. 27, 2018

(30) Foreign Application Priority Data

Nov. 10, 2015  (IT) .......................... 102015000070388
Nov. 10, 2015  (IT) .......................... 102015000070404

(51) Int. Cl.
*B60C 25/138*    (2006.01)
*B60C 25/13*    (2006.01)
*B60C 25/05*    (2006.01)

(52) U.S. Cl.
CPC ........ *B60C 25/138* (2013.01); *B60C 25/0521* (2013.01); *B60C 25/13* (2013.01)

(58) Field of Classification Search
CPC .... B60C 25/138; B60C 25/0521; B60C 25/13
(Continued)

(56) References Cited

U.S. PATENT DOCUMENTS

| 3,168,130 A | | 2/1965 | Turpin | |
|---|---|---|---|---|
| 3,493,030 A | * | 2/1970 | White | .................. B60C 25/132 157/1.24 |

(Continued)

FOREIGN PATENT DOCUMENTS

| CN | 2206221 | 8/1995 |
|---|---|---|
| CN | 2332594 Y | 8/1999 |

(Continued)

OTHER PUBLICATIONS

Chinese First Office Action for Application No. 201680075040.X and English translation, dated Dec. 2, 2019, 16 pages.

(Continued)

*Primary Examiner* — Hadi Shakeri
(74) *Attorney, Agent, or Firm* — Studebaker & Brackett PC

(57) ABSTRACT

A tyre changing machine includes a frame; a wheel support assembly mounted on the frame for locking and setting in rotation a rim of a wheel; at least a bead breaking arm; and a bead breaking tool adapted to carry out the bead breaking operation of the tyre of the wheel. The bead breaking arm is movable between a disengaged position, in which the bead breaking tool is substantially distanced with respect to the tyre, and a working position, in which the bead breaking tool can engage on the tyre. A motor device has an output drive shaft for moving the bead breaking arm. The tyre changing machine further includes means for transmitting drive from the motor device to the bead breaking arm or to the wheel support assembly and adapted to activate the bead breaking arm or the wheel support assembly.

12 Claims, 7 Drawing Sheets

(58) Field of Classification Search
USPC ........................................................ 157/1.24
See application file for complete search history.

(56) References Cited

U.S. PATENT DOCUMENTS

| | | | | |
|---|---|---|---|---|
| 3,780,785 | A | 12/1973 | Schultz et al. | |
| 5,050,659 | A * | 9/1991 | Scalambra | B60B 30/06 157/1.24 |
| 5,300,090 | A * | 4/1994 | Primic | A61H 1/02 601/26 |
| 5,381,843 | A * | 1/1995 | Corghi | B60C 25/025 157/1.24 |
| 5,385,045 | A * | 1/1995 | Mannen | B60C 25/00 73/462 |
| 5,490,552 | A * | 2/1996 | Vignoli | B60C 25/132 157/1.24 |
| 7,343,955 | B2 * | 3/2008 | Cunningham | B60C 25/135 157/1.17 |
| 7,500,504 | B2 * | 3/2009 | Bonacini | B60C 25/13 157/1.17 |
| 7,882,882 | B2 * | 2/2011 | Cunningham | B60C 25/135 157/1.17 |
| 8,613,303 | B1 * | 12/2013 | Hanneken | B60C 25/056 157/1.17 |
| 8,776,858 | B2 * | 7/2014 | Corghi | B60C 25/056 157/1.1 |
| 9,114,675 | B2 * | 8/2015 | Bonacini | B60C 25/13 |
| 9,873,298 | B2 * | 1/2018 | Ferrari | B60C 25/13 |
| 2011/0100558 | A1 * | 5/2011 | Corghi | B60C 25/056 157/1.1 |
| 2012/0291960 | A1 * | 11/2012 | Bonacini | B60C 25/13 157/1.17 |
| 2016/0075196 | A1 * | 3/2016 | Corghi | G01M 1/06 157/1.24 |
| 2017/0050479 | A1 * | 2/2017 | Ferrari | B60C 25/13 |

FOREIGN PATENT DOCUMENTS

| | | | |
|---|---|---|---|
| CN | 1432487 | A | 7/2003 |
| CN | 2767220 | Y | 3/2006 |
| CN | 101138944 | A | 3/2008 |
| CN | 102795063 | A | 11/2012 |
| CN | 102963223 | A | 3/2013 |
| DE | 27 30 815 | A1 | 1/1978 |
| EP | 0 448 042 | A2 | 9/1991 |
| EP | 0557618 | A1 | 9/1993 |
| EP | 0 644 071 | A1 | 3/1995 |
| EP | 0644071 | B1 * | 7/1997 ........... B60C 25/132 |
| EP | 1 329 342 | A1 | 7/2003 |
| EP | 2 319 715 | A1 | 5/2011 |
| EP | 2 444 260 | A1 | 4/2012 |
| EP | 2 484 541 | A1 | 8/2012 |
| EP | 2524819 | A1 | 11/2012 |
| EP | 2 796 302 | A1 | 10/2014 |
| EP | 2 927 028 | A1 | 10/2015 |
| EP | 2 930 038 | A1 | 10/2015 |
| GB | 2118493 | A | 11/1983 |
| RU | 2088425 | C1 | 8/1997 |
| WO | 2015/044917 | A1 | 4/2015 |
| WO | 2015170273 | A1 | 11/2015 |

OTHER PUBLICATIONS

International Search Report and Written Opinion issued in International Patent Application No. PCT/IB2016/052412, dated Aug. 3, 2016; with English translation.

Office Action dated Jan. 10, 2020 in corresponding U.S. Appl. No. 15/774,949.

International Search Report and Written Opinion dated Sep. 14, 2016 in International Application No. PCT/IB2016/052413.

Office Action dated Nov. 29, 2019 in corresponding Chinese Application No. 201680075051.8.

* cited by examiner

TYRE CHANGING MACHINE

RELATED APPLICATIONS

This application is the U.S. National Phase under 35 U.S.C. § 371 of International Patent Application No. PCT/IB2016/052412, filed on Apr. 28, 2016, which in turn claims the benefit of Italian Application No. 102015000070388, filed on Nov. 10, 2015 and Italian Application No. 102015000070404, filed on Nov. 10, 2015, the entire disclosures of which Applications are incorporated by reference herein.

FIELD OF THE INVENTION

The present invention relates to a tyre changing machine, i.e. an apparatus for mounting a tyre on a rim or for demounting a tyre from a rim.

STATE OF THE ART

Apparatuses for mounting a tyre on a rim or for demounting a tyre from a rim are already known in the art and are generally identified with the term "tyre changing machine" or more simply "tyre-changer".

Tyre changing machines generally comprise an electric motor that activates a wheel support assembly for locking and setting in rotation a rim of a wheel from which to demount or on which to mount a respective tyre.

As is known, wheels for motor vehicles generally consist in a metal rim provided, at axial ends thereof, with appropriate containing annular flanges between which a gulley is defined for joint-inserting a tyre, with or without the presence of an inner tube.

In the mounted configuration, the lateral portions of the tyre, the "beads", abut on the containing flanges of the rim.

Tyre-changing machines enable, among other things, complete removal of the tyre from the rim. The procedure can be performed only after the tyre has been debeaded from the respective rim; in fact, as is known, before being able to completely remove the tyre from the rim it is necessary to detach the beads from the containing flanges.

The bead breaking operation is therefore carried out by a special bead breaking assembly and is preliminary to the actual demounting, the bead breaking tool normally being present and therefore associated to the tyre changing machine.

Such bead breaking assemblies can be of various types. One of the most widely used has a bead breaking arm having a substantially horizontal longitudinal extension, hinged to the frame of the tyre changing machine and provided with a paddle-shaped bead breaking tool.

For example, patent publication no. IT-MO-2013-A-110 discloses a tyre changing machine provided with a bead breaking assembly comprising an arm rotatably associated to a machine support structure. The paddle-shaped bead breaking tool is rotatably associated to the rotatable arm which is movable between a disengaged position, in which the bead breaking tool is substantially distanced with respect to a tyre of the wheel to be debeaded, and a working position, wherein the bead breaking tool is adapted to engage on the tyre.

Likewise, patent publication IT-MO-2013-A-272 illustrates a tyre changing machine provided with a bead breaking assembly having a paddle-shaped tool, and comprising an arm hinged to the frame and activated by an appropriate hydraulic or pneumatic actuator.

Patent publication IT-MO-2014-A-67 illustrates a tyre changing machine provided with the usual bead breaking assembly comprising a longitudinally-extending arm substantially horizontal and provided with a paddle-shaped bead breaking tool, the arm being hinged to the frame of the machine and moved by an actuator interposed between the frame and said arm. The actuator is of the fluid type, i.e. it consists in a pneumatic or hydraulic actuator, such as a piston/cylinder couple, and is connected to a fluid activating circuit.

Patent publication IT-MO-2014-A-75 illustrates a tyre changing machine provided with the usual bead breaking assembly comprising a substantially horizontal arm and provided with a paddle-shaped bead breaking tool, the arm being hinged to the frame of the machine and moved by an appropriate actuator interposed between the frame and said arm. In this case, the tyre changing machine also comprises a wheel-raising member for loading the wheel on the locking chuck. The activating actuator is configured for being selectively connectable to the bead breaking arm or to the wheel-raising member.

Patent publication EP-A1-1329342 discloses a further variant of the bead breaker of the traditional type, in which a motor-reducer activates a crank means in rotation, to which a rod element is articulated offset, which rod element has an end freely-slidable internally of a transversally-holed peg and passing in turn through the arm of the tyre-changer.

The rod element is provided with an abutting nut having anti-unscrewing security function from the peg hole, as well as a helix spring interposed between the security nut and the peg. In this way, a rotation of the crank means generates a traction on the arm of the bead breaker towards the wheel to be debeaded.

Patent publication EP-A2-0448042 discloses a tyre changing machine provided with a motor that activates a shank having grooves or recesses, within which plugs of an enmeshing head can be inserted, for example activatable by a pedal. A chain is hooked to the enmeshing head which transmits the drive, imparted to the shank by the motor, to a lateral bead breaking arm, to which the chain is fixed at an intermediate point thereof so as to pull it towards the base of said machine.

Other types of bead breaking assemblies are known, for example assemblies having bead breaking tools of the roller or rotating disc type.

For example, patent publication EP-A1-2444260 discloses a tyre changing machine provided with a base having a receiving means for receiving and moving a wheel in a rotating direction, a frame coupled to the base and having an upright with a longitudinal axis that is parallel to a rotation axis of the wheel mounted, a first and a second tool supported by the upright and movable in an axial direction and in a radial direction with respect to the longitudinal axis of the upright, said first and second tools being adapted for example to be constituted by bead breaking discs.

A further example is provided by patent publication EP-A1-2484541, which discloses a tyre changing machine comprising a frame having a support element configured for supporting the wheel rotatably about a rotation axis, a bead breaking tool of the disc-configured type and associated to the frame, movable towards and away from the support element along a movement direction that is parallel to the rotation axis of the wheel, by means of an appropriate actuator that can be hydraulic, pneumatic or electric. In general, however, for any type of bead breaking assembly, whether being a paddle-shaped, disc-shaped, roller-shaped or otherwise, there is, in the prior art, the presence of at least a dedicated actuator which in the traditional paddle systems is frequently a pneumatic cylinder, while in the case of roller or disc assemblies, there is a greater variability of type, including for example fluid types but also, though more rarely, electric types. In any case, it is stressed that the fact that this additional actuator, in addition to those already necessarily present on the tyre changing machine, for example for locking and setting the wheel in rotation, leads to an inevitable increase in the number of components of the machine, with a consequent increase in the complexity of the system in terms of maintenance and reliability, as well as costs.

In a case where, on the other hand, this additional actuator is not present, such as in some, though less common, known solutions, the movement of the bead breaking arm is however only partial, or it necessarily implicates the contemporaneous, as well as undesired, movement of other components of the tyre changing machine.

Further, in the particular case of an actuator of a pneumatic or hydraulic type and a paddle bead breaking tool, during the bead breaking operation the operator needs to keep a hand on the paddle or on a gripping handle of said paddle. The handle is sometimes part of an actual control lever for activating the fluid actuator. In all these cases, as during the bead breaking operation the detachment of the tyre can occur unexpectedly as the force applied by the paddle exceeds a certain threshold value, beyond which the bead separates from the rim, the operator's hand is subject to unpleasant jolts. This means that the bead breaking step is extremely uncomfortable and indeed possibly dangerous for the operator, who is pulled and subjected to the counterblow from the bead breaking arm. Further, at these moments the operator also loses sensitivity in the control of the control lever of the actuator of the bead breaker, which can lead to damage to the tyre or the rim of the wheel.

Aim of the Invention

In the light of the above, the Applicant set the objective of providing a tyre changing machine able to obviate the unresolved drawbacks found in the prior art.

An aim of the present invention is therefore to provide a tyre changing machine with a limited number of components, in particular with a small number of actuator devices.

A further aim of the present invention is to provide a tyre changing machine that is simple to maintain, sturdy and reliable, as well as efficient and showing high-performance.

A further aim of the present invention is to provide a tyre changing machine that is safe and practical to use, in particular during the bead breaking step.

A further aim of the present invention is to disclose a tyre changing machine which allows a high degree of control over the bead breaking process by the operator, preventing any possibility of damaging the tyre or the rim of the wheel.

These and other aims will be obvious to a person skilled in the art, from the following description and the appended drawings.

SUMMARY OF THE INVENTION

The Applicant has found that such objectives and aims can be attained by a tyre changing machine comprising a frame, or bearing structure, restable on a rest surface, a wheel support assembly, mounted on the frame, for locking and setting in rotation a rim of a wheel from which to demount or on which to mount a respective tyre.

The tyre changing machine according to the present invention comprises at least a bead breaking arm associable to the frame and a bead breaking tool associated to the bead breaking arm and adapted to carry out the bead breaking operation of the tyre of the wheel. Said bead breaking arm is movable between a disengaged position, in which the bead breaking tool is substantially distanced with respect to the tyre of the wheel to be debeaded, and a working position, wherein the bead breaking tool can engage on the tyre.

A motor device, having an output drive shaft, moves the bead breaking arm between the disengaged position and the working position and/or vice versa, The tyre changing machine according to the present invention further comprises means for selectively transmitting drive from the motor device to the bead breaking arm or to the wheel support assembly, said means being adapted to selectively activate said bead breaking arm or said wheel support assembly.

In this way, the same motor device is used for selectively moving, time by time and by the choice of the operator, one of at least two different components necessarily always present internally of a tyre changing machine, i.e. the wheel support assembly and the bead breaking assembly.

The means for selectively transmitting drive can comprise any drive selector device associated to the motor device of the tyre changing machine.

According to an embodiment, the task of the drive selector device is to transmit, by choice of the operator, the drive from the motor device to various components of the tyre changing machine, for example to the bead breaking arm, to the support, locking and rotating assembly of the wheel and possibly to the mounting/demounting tool and the movable support structures thereof, such as an upright or tiltable post, and where present, also to a wheel raising device, associated or associable to the frame of the machine, in order to move the wheel from the rest surface of the tyre changing machine to the wheel support assembly and/or vice versa. In all these cases the means for selectively transmitting drive enable the operator to choose which specific component of the tyre changing machine will be alternatively moved and/or set in function by the motor device.

In a particular embodiment, the bead breaking arm has a first end directly or indirectly hinged by an intermediate arm to the frame of the tyre changing machine and is provided, at the opposite end thereof, with a bead breaking tool having a paddle, blade, hook, disc, cylindrical or other shape. In these cases, the wheel support assembly is such that the wheel is generally locked and set in rotation about a vertical axis, and the bead breaking arm has a longitudinal direction that is substantially horizontal.

According to a particular embodiment, however, the wheel support assembly might be able to set the wheel to be operated on in rotation about a non-vertical axis, for example about a horizontal axis.

According to a further embodiment, the wheel support assembly might be able to tilt between a horizontal position and a vertical position, and/or vice versa.

In a different embodiment, the tyre changing machine is provided with a base having a support assembly for receiving and moving a wheel in a rotating direction, a frame coupled to the base and having an upright with a longitudinal axis that is substantially parallel to the rotation axis of the wheel mounted on the support assembly. In this case, at least a bead breaking arm is associated to the upright and has a longitudinal direction that is substantially perpendicular to said upright. The bead breaking arm, which is provided with a rotating disc-shaped, roller-shaped or other bead breaking tool, is generally translatable along the longitudinal direction of the upright, so as to towards or away from the rotation plane of the wheel; further, it is also generally translatable in a perpendicular direction to the rotation axis of the wheel so as to move the bead breaking tool towards/away from the bead of the tyre on which to operate.

In all the above embodiments, the motor device used for setting in rotation the wheel support assembly is also used to move the bead breaking arm of the bead breaker.

Such a motor device can be of any type, for example electric, pneumatic, hydraulic or the like.

According to a preferred embodiment, the above-mentioned motor device comprises an electric motor, provided with an appropriate output drive shaft.

According to an embodiment, the means for selectively transmitting the drive from the motor device to the bead breaking arm or to the wheel support assembly or to other components of the tyre changing machine, comprises a drive selector device associated to the drive shaft, first drive transmission means mounted on the drive shaft and adapted to transmit the drive to the wheel support assembly, and second drive transmission means mounted on the drive shaft and adapted to transmit the drive to the bead breaking arm.

The means for selectively transmitting drive from the motor device to the different components of the tyre changing machine can be of various types, for example they can comprise transmission pulleys and members such as belts, cords, cables or chains; they can comprise gearings, for example constituted by two or more cogwheels or cascade-gear transmission systems, or in general any other known type for transmitting drive, including combinations of systems of different types.

According to a particular embodiment, the means for selectively transmitting the drive from the motor device, for example an electric motor, to the bead breaking arm or to the wheel support assembly or to other components of the tyre changing machine, comprise a drive selector device associated to the output drive shaft of the motor device, a first pulley mounted on the drive shaft and adapted to transmit the drive to the wheel support assembly, and a second pulley mounted on the drive shaft and adapted to transmit the drive to the bead breaking arm.

According to a further embodiment, the means for selectively transmitting the drive from the motor device, for example an electric motor, to the bead breaking arm or to the wheel support assembly or to other components of the tyre changing machine, comprises a drive selector device associated to the output drive shaft of the motor device, a first cogwheel, for example being a part of a first pair of gearings, adapted to transmit the drive to the wheel support assembly, and a second cogwheel, for example being a part of a second pair of gearings, adapted to transmit the drive to the bead breaking arm.

The drive selector device is generally adapted to be removably coupled to the first or the second drive transmission means, for example to the first or the second pulley or to the first or second cogwheel.

According to an embodiment, the coupling or enmeshing of the drive selector device is removable as the operator, by choice, can decouple or remove the selector device from determined drive transmission means and couple or enmesh it to other drive transmission means, which might be pulleys, gearings or the like, so as to transmit the drive to different components of the tyre changing machine, according to needs.

In a particular embodiment, the coupling and/or the decoupling of the drive selector device can also be done, partially or totally, automatically, on the basis of pre-ordered and/or possibly selectable functioning logics selected by the operator.

According to a further embodiment, the automatic coupling and/or the decoupling of the drive selector device is realised using actuating devices, activated by an electronic control system appropriately configured and possibly provided with connections with one or more sensors.

In a case where there are further pulleys or further gearings, for example for transmitting the drive to further components of the tyre changing machine, the selector device can also obviously couple removably to these.

For example, in a case where there is a wheel raising device, at least a further pulley or gearing is adapted to transmit the drive to the wheel raising device; the drive selector device can obviously be removably coupled also to said further pulley or gearing.

In a preferred embodiment, the drive selector device comprises a selector element, preferably having a circular crown shape, mounted radially fixed and axially movable on and with respect to the drive shaft. The coupling is for example realisable using grooved channels or the like, for example by means of a woodruff key coupling. Further, a control device is also present, preferably fork-shaped, so as to axially translate the selector element along the drive shaft and respectively enmesh the first, the second or further pulleys (or gearings).

The selector element can be of various types, for example with frontal enmeshings or lateral enmeshings. A drive synchroniser, a clutch or another device can be present. The enmeshing can be facilitated by use of a selector element having a portion with a truncoconical profile destined to couple with a corresponding cavity afforded in a respective pulley or cogwheel.

In an embodiment, to facilitate the enmeshing of the selector element, the respective drive selector device can be provided with appropriate elastic means that, acting between the control device and the selector element, facilitates enmeshing or releasing thereof. The elastic means can for example be constituted by preloaded springs.

In a further embodiment, the drive selector device can comprise appropriate recall means, for example of the elastic type, for recalling, automatically and on command of an operator, the selector device so that said selector element enmeshes on a specific pulley, gearing or the like, so as to enable, for a particular configuration that we might call "default" configuration, the motor device to be operatively always connected, with certainty, to the same component of the machine.

Said specific predefined "default" configuration, i.e. by choice of the operator, can for example be located at the start or the end of a determined step internally of the bead breaking operation or mounting/demounting procedure of the tyre or at the start or at the end of the use of a particular component of the tyre changing machine.

More in general, and irrespective of the existence or not of special "default" configurations, in a particular embodiment, the coupling and/or the decoupling of the drive selector device can be done, partially or totally, automatically, on the basis of pre-ordered and/or possibly selectable functioning logics selected by the operator.

According to a further embodiment, the automatic coupling and/or the decoupling of the drive selector device is realised using actuating devices, activated by an electronic control system appropriately configured and possibly provided with connections with one or more sensors.

According to an embodiment of the present invention, the tyre changing machine comprises a rotating rod element for the movement of the bead breaking arm between the disengaged position and the working position relative to the tyre to be debeaded and/or vice versa; an appropriate pulley for transmitting the drive to the bead breaking arm is associated to the rotating rod element and is connected to the second pulley via drive transmission means, preferably by means of flexible members, for example of the belt, cable or chain type. The rotary movement of this further pulley is then transmitted to the rod element, which in turn rotates. A like movement of the rod element is obviously realised also using systems for transmitting the drive different from pulleys, for example using gearings.

A cursor element, operatively associated to the bead breaking arm via appropriate connecting means, is mounted translatably axially on the rotating rod element. Further, also present are drive transforming means of the rotary motion of the rotating rod element into linear motion of the translatable cursor element.

According to a preferred embodiment, the drive transforming means are constituted by the fact that the rotating rod element comprises control or manoeuvring screw-shaped portion, for example an endless screw, and the translatable cursor element, in fact an endless screw, comprises an internal nut screw-shaped cavity in which the endless-screw shaped portion of the rod element engages.

In a particular embodiment, the connecting means between the translatable cursor element and the bead breaking arm comprise an arm solidly associated to the translatable cursor element. This arm comprises, for example, though not necessarily, a pin associated to a slot afforded on the bead breaking arm at an end of the arm that is opposite the position of the translatable cursor element. The slot can have various shapes, according to the type of movement path in which it is desired that the bead breaking arm can be moved.

In a different embodiment, the connecting means comprises an arm solidly associated to the translatable cursor element. This arm comprises, for example, though not necessarily, a pin associated to a con rod afforded on the bead breaking arm at an end of the arm that is opposite the position of the translatable cursor element. The con rod is in turn hinged to the bead breaking arm by means of a further pin, which pin can alternatively be directly fixed on the bead breaking arm or can engage in an appropriate slot.

In a further embodiment, the connecting means comprise an arm solidly associated to the translatable cursor element. This arm comprises, for example though not necessarily, at an end thereof that is opposite with respect to the position of the translatable cursor element, at least a portion adapted to engage translatably internally of an appropriate seating, for example a through-hole, preferably having a circular section, fashioned in a pin associated to the bead breaking arm. Said pin is preferably associated to the bead breaking arm rotatably about a longitudinal axis thereof. In this way, the connection between the arm associated to the cursor element and the bead breaking arm remains unconstrained and enables an operator to manually manoeuvre the bead breaking arm where necessary.

Further connecting means between the cursor element and the bead breaking arm can of course be included, as can various coupling modes between the bead breaking arm and the frame or other structural elements of the tyre changing machine.

For example, in an embodiment alternative to the one which includes the presence of a translatable cursor element and associated to a rotating rod element, the tyre changing machine of the present invention comprises means for selectively transmitting drive from the motor device to the bead breaking arm.

The means comprises threaded means having an external screw-thread and hollow counter-threaded means operatively coupled with the threaded means having an external screw-thread. In an embodiment, the threaded means with external screw-thread comprise a rod element having at least a first screw-shaped manoeuvring portion, for example but not necessarily, having a trapezoidal threading.

According to an embodiment, the hollow counter-threaded means comprises a tubular body, for example but not necessarily having a circular section, having a cavity, for example a through-cavity or in any case having an opening towards the outside, preferably at a longitudinal end thereof, which cavity comprises at least a portion in the shape of a nut screw operatively coupled to the screw-shaped manoeuvring portion of the rod element.

According to a possible embodiment, the coupling between the threaded means with external screw-thread and the hollow counter-threaded means is realised by use of ball screws, i.e. with the use of revolving bodies interposed between the screw and the nut screw.

According to a further embodiment, the means for transmitting drive from the motor device to the bead breaking arm is adapted to set the tubular body in rotation, internally of which the rod element is free to axially slide in screwing and/or unscrewing direction.

According to a further embodiment, alternative to the preceding embodiment, the means for transmitting drive from the motor device to the bead breaking arm are adapted to set the rod element in rotation, externally of which the tubular body is free to axially slide in screwing and/or unscrewing direction.

According to a further preferred embodiment, the tyre changing machine according to the present invention further comprises connecting means for operatively associating the above-described means for selectively transmitting drive described in the foregoing to the bead breaking arm. The connecting means are adapted to engage, in a free sliding coupling, the means for transmitting the drive, which further comprise a striker element adapted to engage with the connecting means and/or the bead breaking arm.

In a preferred embodiment, the rod element comprises a second portion, preferably not threaded, still more preferably smooth, destined to engage, in a free sliding coupling, in the connecting means.

According to a particular embodiment, the connecting means comprise a sleeve-shaped element for engaging said second portion of the rod element.

According to an embodiment, the rod element preferably has a circular section. However, other types of section are possible, and in any case the sleeve-shaped element will have a cavity appropriately counter-shaped so as to correctly engage the rod element. It is also possible for the rod element to have different sections along the longitudinal extension thereof, for example a circular section in the first screw-shaped manoeuvring portion, and different type of section in the second portion thereof, destined to engage, in a free sliding coupling, in the connecting means.

According to another embodiment, the connecting means comprise an element having a grooved profile, preferably but not necessarily of the dove-tail type, for engaging said second portion of the rod element, which has an appropriately shaped section.

According to an embodiment, the connecting means is hinged, by at least a pin, to the bead breaking arm. In a case in which the bead breaking arm is arranged along a substantially horizontal plane, the pin can be advantageously arranged along a vertical axis, so as to enable a rotating movement of the bead breaking arm about the pin axis. In a preferred variant embodiment, the pins are at least two in number, arranged on opposite sides with respect to the bead breaking arm, in any case along the same vertical axis.

According to a preferred embodiment, the at least a pin is adapted to engage in a respective slot fashioned in the bead breaking arm. In a case where two pins are present, the bead breaking arm will comprise two respective slots.

According to a further embodiment, the connecting means are hinged, by means of at least a first pin, to an intermediate connecting element, for example an arm or con rod. The intermediate connecting element is in turn hinged, by at least a second pin, to the bead breaking arm.

According to an embodiment, the means for transmitting the drive from the motor device to the bead breaking arm further comprises a striker element, which is preferably mounted at the second portion of the rod element, preferably at a distal end thereof with respect to the frame of the tyre changing machine.

The striker element can either be engaged on the connecting means and/or on the bead breaking arm, which can be provided with respective abutment surfaces and/or appropriate damping means, for example springs or elastic pads.

The striker element, for example a nut, preferably also has a security function preventing the rod element from unscrewing from the connecting means, and/or an end-run function.

In a further embodiment, the control device, in order to axially translate the drive selector element along the drive shaft, can be usefully connected to appropriate control means activatable by an operator. The control means activatable by an operator can comprise a lever, a pedal, a button, a Bowden cable, or the like, and/or any combination thereof or like known means.

The means can be of a mechanical, electro-mechanical or electronic type. Said control means activatable by an operator can possibly also comprise appropriate actuators and relative control electronics. In a particular embodiment they can comprise a communications and control system of the wireless type.

In a preferred embodiment, the control means activatable by the operator, in order to control the functioning of the control device of the drive selector element, can comprise a control lever used not only for controlling the drive selector, but also for activating the movement of the bead breaking arm, once the latter has been made operative by a corresponding enmeshing of the selector element. For this aim, the control lever is configured as a multi-function device and can comprise various operating positions corresponding to respective controls, i.e. it can comprise one or more buttons.

BRIEF DESCRIPTION OF THE DRAWINGS

Further characteristics and advantages of a preferred, but not exclusive, embodiment of a tyre changing machine according to the present invention will appear more clearly from the detailed description.

This description will be explained below with reference to the attached drawings, provided solely for indicative and therefore non-limiting purposes, in which.

DETAILED DESCRIPTION OF A PREFERRED EMBODIMENT OF THE INVENTION

In the description that follows, any expressions used, for example "right", "left", "above", "below", "upper", "lower" and the like, have a merely illustrative aim and refer to the particular arrangement of the elements present in the accompanying figures, and therefore have no limiting characteristics.

Figure 1:
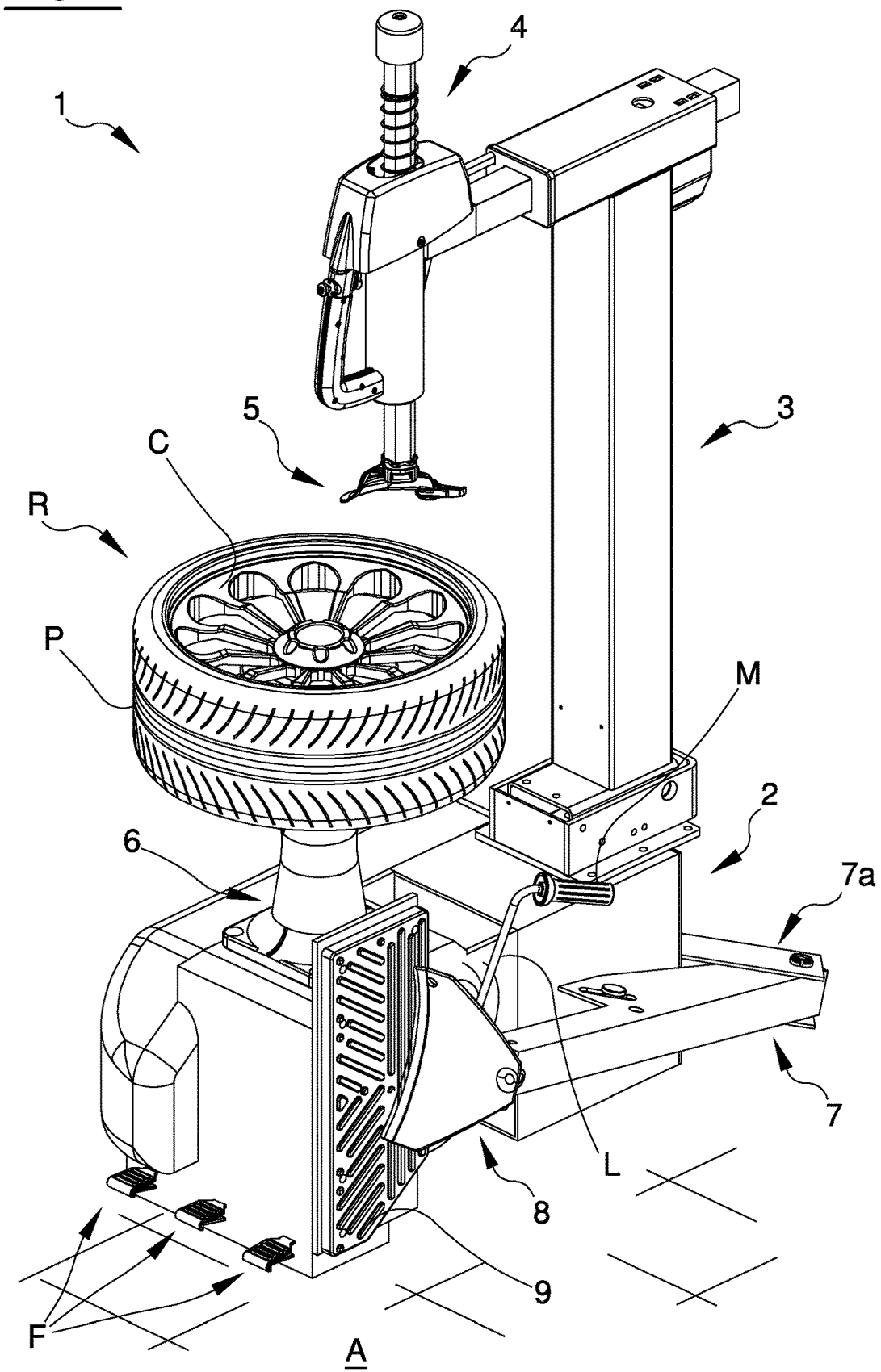
FIG. 1 shows a schematic axonometric view of a tyre changing machine according to the present invention, provided with a bead breaking assembly with a paddle-shaped bead breaking tool and a wheel mounted on the wheel support assembly.

The tyre changing machine illustrated in the accompanying figures is of the "traditional" type, i.e. provided with a bead breaking arm having a longitudinal direction that is substantially horizontal and provided, at an end thereof, with a paddle-shaped bead breaking tool. The present invention is absolutely not limited to said specific "traditional" configuration of a tyre changing machine, and in reality is applicable also to tyre changing machines having different configurations as well as bead breaking assemblies of various types. The description that follows, however, will refer for the sake of simplicity to a tyre changing machine of the "traditional" type, as illustrated in FIG. 1. The tyre changing machine 1 comprises a support structure or frame 2 restable on a generally horizontal support surface or rest plane A.

The frame 2 of the tyre changing machine 1 supports an upright or support post 3 having a vertical extension, adapted to support means 4 for mounting/demounting a tyre P to/from a respective rim C of a wheel R. The means 4 for mounting/demounting comprise at least a mounting/demounting tool 5, having a lever, hook or the like. The mounting/demounting means 4 can further comprise a plurality of accessories, for example a bead presser or the like, not shown in the figures.

The tyre changing machine 1 illustrated in FIG. 1 further comprises a wheel support assembly 6, mounted vertically on the frame 2, for locking and rotating a rim of a wheel about a central axis thereof.

Such assembly 6 can be of various types, for example it can comprise a rotating plate provided with grips for hooking the rim at the annular containing flanges thereof, or, as in the illustrated case in the figures, can be designed to lock the rim at the central hole thereof, using appropriate locking means.

A bead breaking arm 7 is associated, normally hinged to the frame 2 of the machine 1, about a rotation axis that is substantially vertical, at a first end thereof. The associating of the bead breaking arm 7 to the frame can be done directly or indirectly by means of, for example, an intermediate arm 7a, which can be solidly constrained to the frame or associated movably with respect to the frame, for example, but not necessarily, hinged to the frame.

The bead breaking arm 7 illustrated in FIG. 1 has a longitudinal extension that is substantially horizontal, though inclined by a few degrees upwards, so as to facilitate the bead breaking operations for wheels having large dimensions. By bead breaking arms having a longitudinal extension that is substantially horizontal are meant bead breaking arms having a longitudinal horizontal or inclined extension, in general though not necessarily upwards (i.e. on the opposite side with respect to the rest plane of the tyre changing machine), by a few degrees with respect to the horizontal plane, for example inclined by 25° with respect to the horizontal plane, preferably up to 15°. It is however possible, within the scope of the present invention, to have inclinations of the bead breaking arm that are different from those mentioned here purely by way of non-limiting example.

Figure 3:
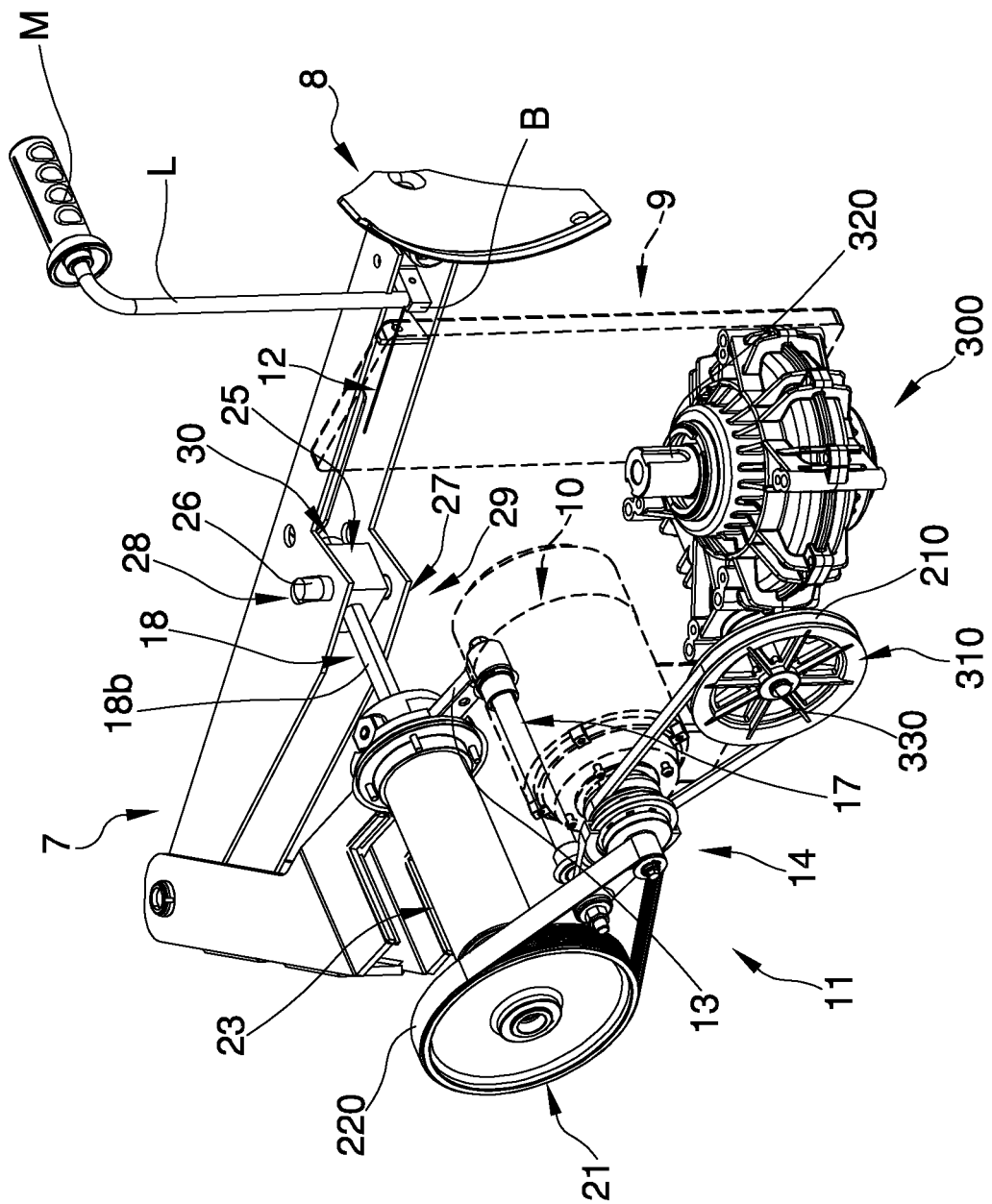
FIG. 3 and FIG. 4 illustrate, in an overall view, the means for selectively transmitting drive from the motor device to the bead breaking arm, according to the present invention, connected with a bead breaking arm shown in a disengaged position and in a working position, respectively.
Figure 4:
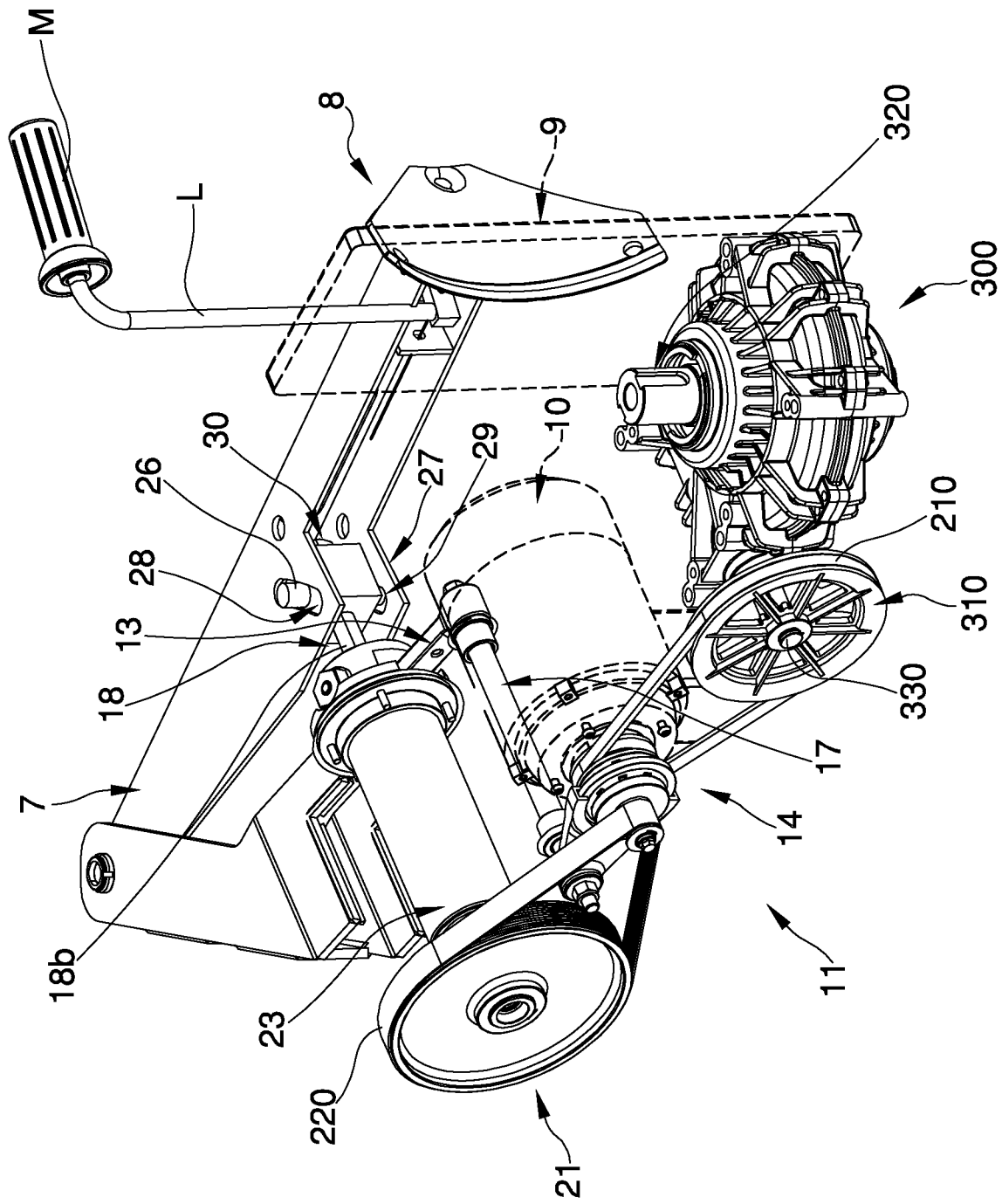

The bead breaking arm 7 is provided at a second end thereof with a bead breaking tool 8, for example having a blade shape, a paddle shape or another shape. The bead breaking tool 8 interacts with the beads of the tyre P to carry out the bead breaking operation, i.e. for detaching said beads from the rim, before the following actual demounting. The bead breaking arm 7 is movable between a disengaged position, in which said bead breaking tool 8, as illustrated in FIG. 3, is substantially distanced from the frame 2 and therefore with respect to the tyre of the wheel to be debeaded, and a working position, wherein said bead breaking tool is closer to the frame 2 of the tyre changing machine 1, as illustrated in FIG. 4, and therefore can potentially engage on said tyre. In regard to this, a substantially vertical opposing surface 9 is mounted on the frame of the bead breaking tool 8 at the area of action of the tyre changing machine, against which opposing surface 9, in use, the wheel R is arranged with the tyre P to be debeaded, also vertically, i.e. with the central axis thereof arranged horizontally. The opposing surface 9 is adapted to cooperate with the bead breaking tool 8 so as to carry out the bead breaking operation of the tyre P. This opposing surface 9, for example made of a plastic material, is knurled so as to increase the coefficient of friction with the wheel R placed against it.

The tyre changing machine 1 has one or more control pedals F for managing the functions thereof, for example for setting the support assembly 6 in rotation, for locking and/or for freeing the wheel on/from the support assembly 6, so as to activate the bead breaking arm 7, etc.

The tyre changing machine 1 is provided with a motor device 10, preferably an electric motor 10, provided with an output drive shaft 10a.

The motor device is used for transmitting drive to the support assembly 6, generally for activating at least the rotation. In some cases, and with appropriate support assemblies, for example as illustrated in patent publication EP-A1-2639566, the motor device is adapted, as well as setting the support assembly and possibly a rim mounted thereon in rotation, to activate the locking and/or release of the rim on/from the support assembly. The bead breaking arm 7 can be provided, in proximity of the bead breaking tool 8, with a control lever L which generally comprises a grip or handle M. Said control lever L can advantageously control the motor device 10 for activating the movement of the bead breaking arm as well as, eventually, for controlling a drive selector device, as illustrated in the following.

The tyre changing machine 1 of the present invention further includes means 11 for selectively transmitting the drive from the motor device 10 to the bead breaking arm 7 or to the wheel support assembly 6. Said means 11 can be activated by an operator, who can therefore choose, time by time, whether to use the motor device 10 for activating the wheel support assembly 6 or the bead breaking arm 7.

Figure 2:
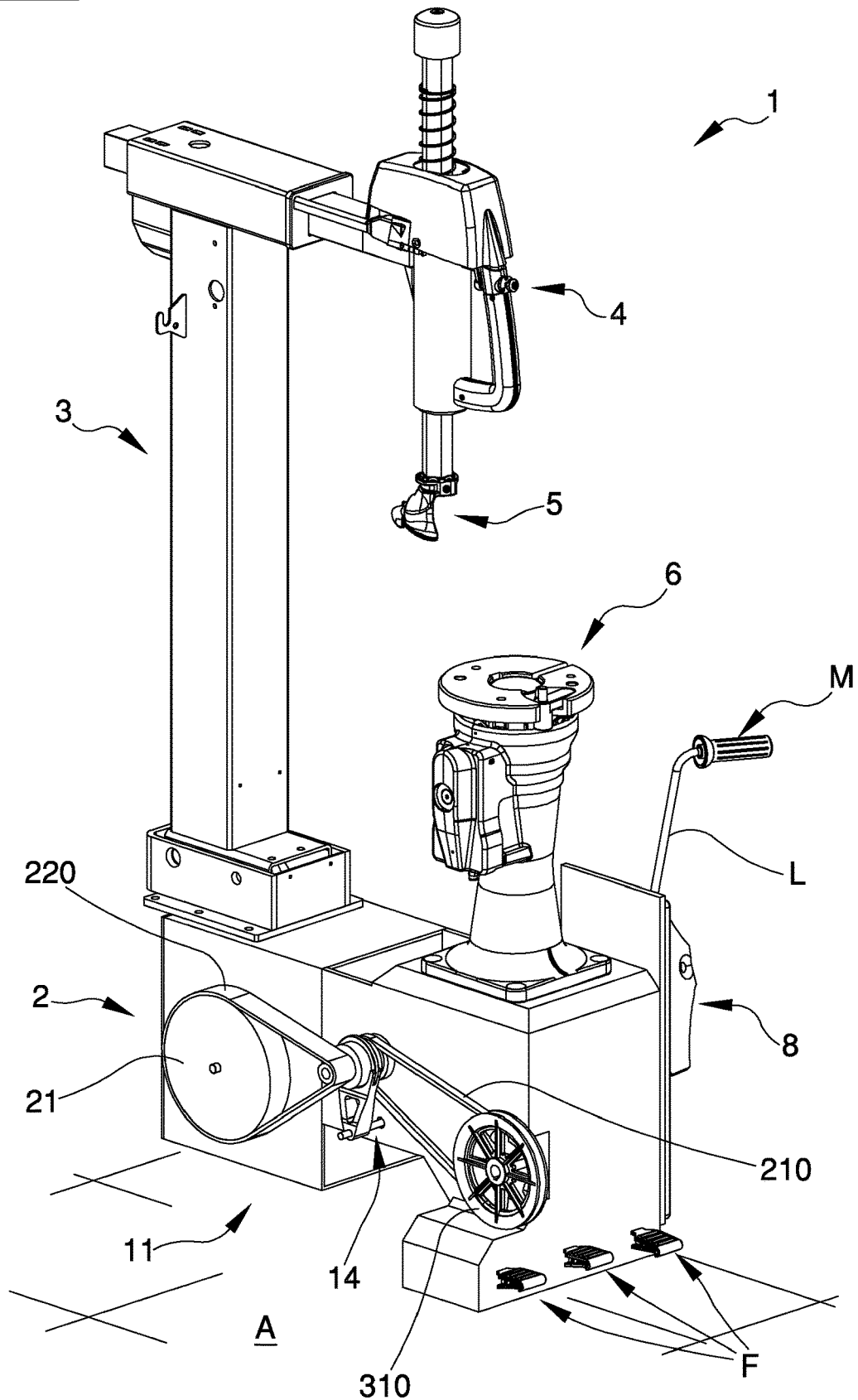
FIG. 2 illustrates the machine of FIG. 1, in an axonometric view but on an opposite side with respect to FIG. 1 and with the casing partly removed, so as to highlight the location of the means for selectively transmitting drive.

In FIG. 2, a lateral casing has been removed from the tyre changing machine 1 in order to make visible the position of the means 11 for selectively transmitting the drive 10 from the motor device 10, with reference to a preferred embodiment.

In FIG. 3 and FIG. 4, the means 11 is illustrated in greater detail. The electric motor 10 is provided with the drive shaft 10a on which a drive selector device 14 is mounted.

A first pulley 15 is mounted idle on the drive shaft 10a and is adapted to transmit the drive to the wheel support assembly 6; a second pulley 16 is also mounted idle on the drive shaft and is adapted to transmit drive to the bead breaking arm 7.

Figure 5:
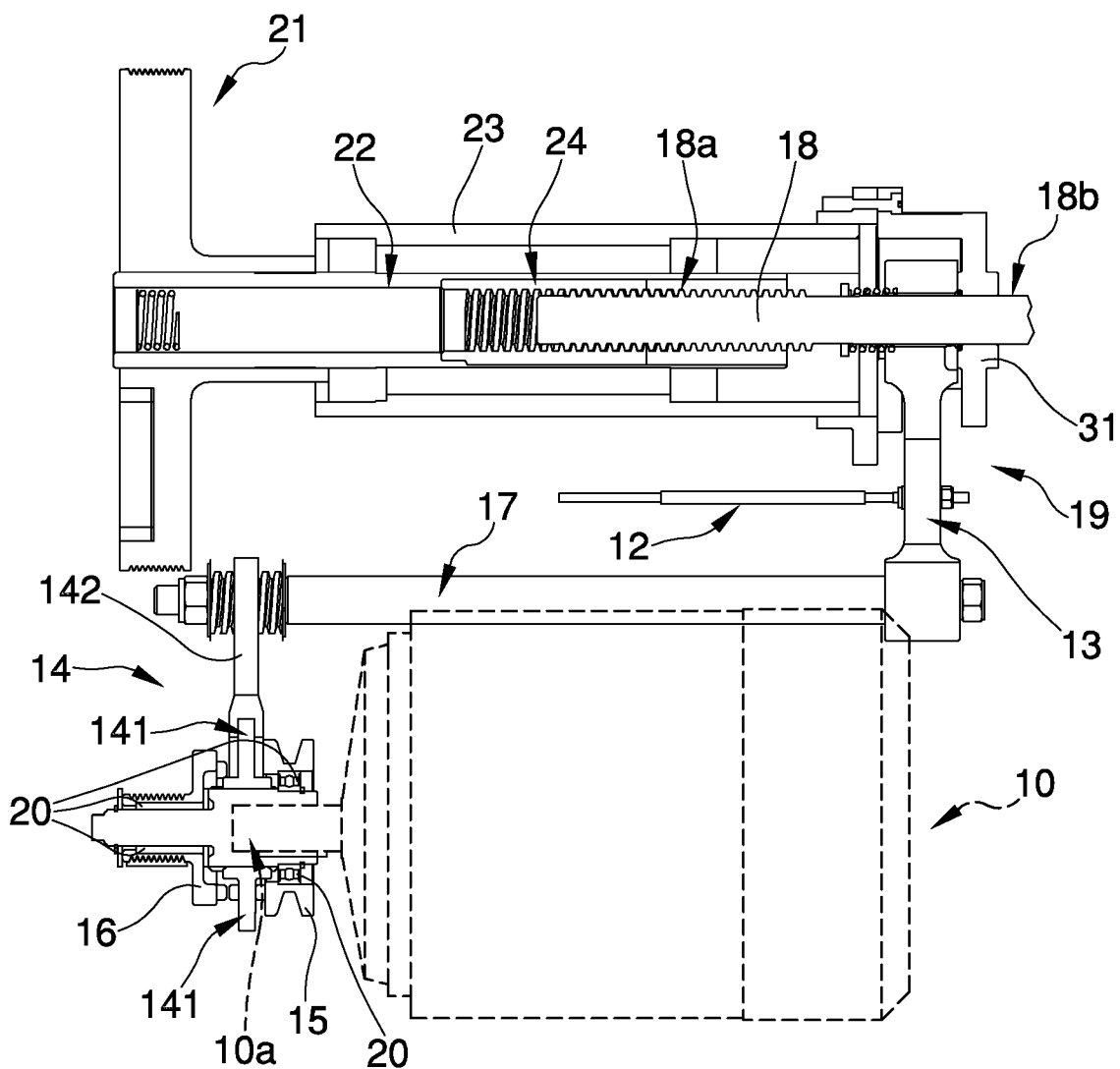
FIG. 5 and FIG. 6 illustrate, with partly-sectioned lateral views, some details relative to the means for selectively transmitting drive of FIG. 3 and FIG. 4, respectively in a first configuration in which the selector element transmits the drive to the wheel support assembly (FIG. 5) and where the selector element transmits the drive to the bead breaking arm (FIG. 6)
Figure 6:
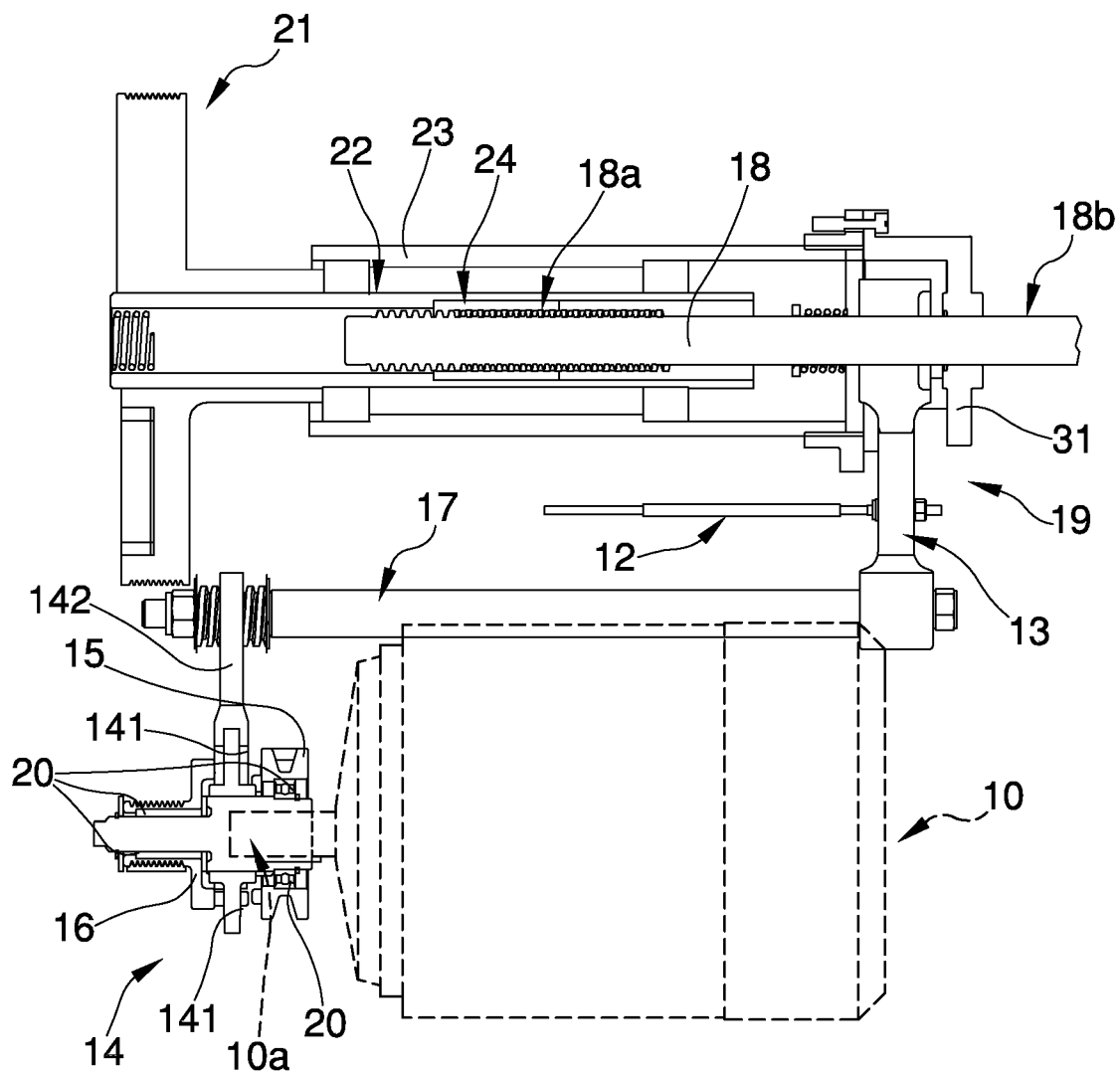

As illustrated in FIGS. 5 and 6, both the pulleys are supported on the shaft by appropriate support elements 20, for example bearings, and retained in the seating by retaining means.

The drive selector device 14 is configured to be removably coupled to the first 15 or the second 16 pulley.

Said removable coupling is preferably made in the following way.

The drive selector device 14 comprises a selector element 141 and a control device 142. The selector element 141 preferably has a circular crown shape, and is mounted on the drive shaft 10a by a woodruff key coupling, i.e. with the use of grooved profiles. In this way, the selector element 141 cannot move radially with respect to the axis of the drive shaft 10a, however it is free to slide axially thereon. The selector element 141 is axially moved by the control device 142, which is preferably fork-shaped, and is coupled to the selector element 141 at a peripheral annular portion thereof. The control device 142 is therefore adapted to translate the selector element 141 axially along the drive shaft 10a, in order to enmesh the first or second pulley, according to the direction of the axial translation which is imparted thereon. The selector element 141 can be of various types, for example having frontal enmeshing.

The coupling between the selector element 141 and the pulleys is therefore temporary. In fact, as mentioned, said selector element 141 can slide axially along the drive shaft 10a in response to a stress received from the fork-shaped control device 142, which in turn is activated by appropriate control means 19 activatable by an operator. The control means 19 can be connected to the control lever L associated to the bead breaking arm 7, or can be connected to various control means, for example to a second control lever distinct from the first lever L, or a pedal, a button or the like, also in combination with each other.

FIG. 5 illustrates a case in which the selector element 141 is enmeshed on the first pulley 15. It transmits drive, by means of a first belt 210, to the wheel support assembly 6.

The first belt 210 is preferably a trapezoidal-profiled belt. With reference to FIGS. 3 and 4, the belt 210 sets a pulley 310 in rotation. Said pulley 310 is connected to appropriate means 300 for setting the wheel support assembly 6 in rotation.

The means 300 comprise a shaft 330 set in rotation by the pulley 310 and having a screw-shaped manoeuvring portion, for example an endless screw, which is coupled to a cogwheel and/or to other transmission elements, for example comprising a reducer assembly, adapted to set in rotation the shaft 320 which in turn moves the wheel support assembly 6.

FIG. 6 illustrates the case in which the selector element 141 is enmeshed on the second pulley 16. It transmits drive to the bead breaking arm 7 by means of a second belt 220.

The second belt 220 is preferably of the Poly-V type or it is a cogged belt, with cogs arranged transversally with respect to the longitudinal extension thereof.

The second belt 220 engages and sets in rotation a pulley 21 operatively connected to a tubular body 22.

The rotation of the second pulley 16 then sets in rotation the pulley 21 and therefore also the tubular body 22.

Figure 7:
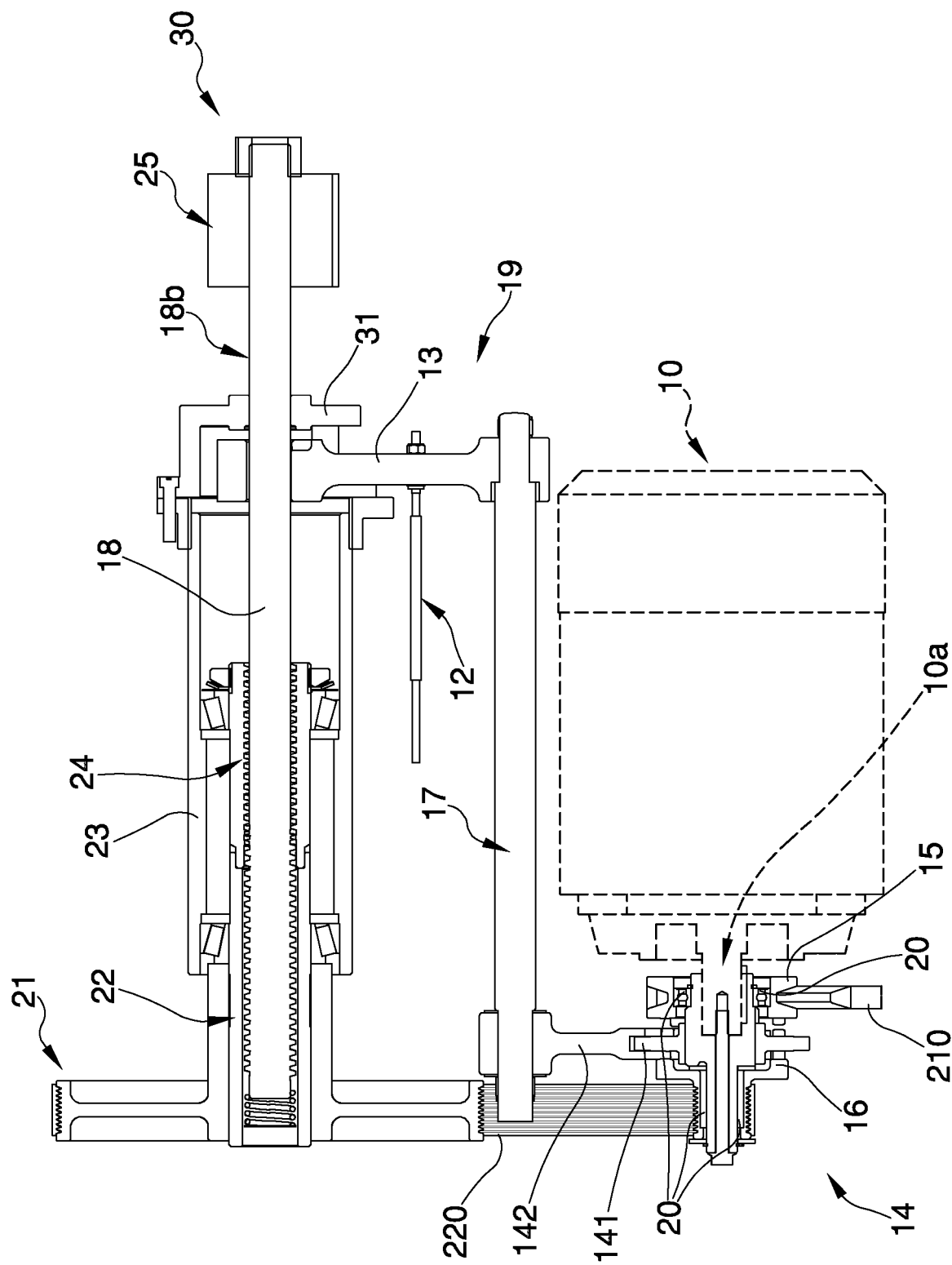
FIG. 7 illustrates, in a partly-sectioned lateral view, a particular embodiment of the means for transmitting drive to the bead breaking arm.

In the embodiment illustrated in FIG. 7, the means for transmitting drive from the electric motor to the bead breaking arm comprises a pulley 21 mounted solidly to the tubular body 22, which is supported by means of appropriate bearings, for example of a type having conical rollers, by a support tube 23 solidal to the frame 2 of the tyre changing machine.

The tubular body 22 is internally hollow, and comprises at least a nut screw-shaped portion. The nut screw-shaped portion can be made with an endless screw 24 solidly fixed to the tubular body.

The endless screw 24 is operatively coupled with a screw-shaped manoeuvring portion 18a of a rod element 18. The screw-shaped manoeuvring portion 18a is preferably of the trapezoidal screw type, and consequently the endless screw 24 is preferably of the trapezoidal type.

The rotation of the tubular body 22 and of the endless screw 24 therefore set the rod element 18 in movement, which slides axially, in screwing and/or unscrewing direction, at least partially within the tubular body.

In the axial movement thereof, the rod element 18, while remaining operatively connected to the endless screw 24, will generally be adapted at least partially to exit from the tubular body 22, so as to engage appropriate connecting means 25 associated to the bead breaking arm 7.

The rod element 18 further comprises a second portion 18b, for example, but not necessarily, having an at least partially circular section, which is preferably smooth, i.e. does not have threads.

The tube 23 is provided with a flange 31 which interacts with the smooth portion 18b of the rod element 18, thus preventing an eventual rotation thereof and ensuring a movement of a purely translational type. The interaction of the flange 31 with the smooth portion 18b of the rod element 18 occurs by virtue of a shoulder (not illustrated in the figures) fashioned on the smooth portion 18b of the rod element 18.

Said second smooth portion 18b of the rod element 18 is preferably destined to engage in the connecting means 25, which for example comprises a sleeve-shaped element, in which the smooth portion 18b of the rod element 18 can freely slide.

The sleeve is provided with a first and a second pins 26, 27 destined to engage in respective slots 28, 29 fashioned on the bead breaking arm 7. The two pins 26, 27 are preferably arranged along the same vertical axis. The two slots 28, 29 are fashioned on respective surfaces solidly constrained to the bead breaking arm, a first surface located in a distal position with respect to the rest plane A, and a second surface located in a proximal position with respect to said rest plane A.

A striker element 30, for example a security nut preventing unscrewing with end-run functions, is preferably mounted to an end of the smooth portion 18b of the rod element 18 that is opposite with respect to the frame 2 of the machine 1 and in any case externally of the bead breaking arm 7 and the sleeve 25.

Operatively, starting from the position illustrated in FIG. 3, in which the bead breaking arm 7 is in the disengaged configuration i.e. is completely open, the rotation of the pulley 21 sets the tubular body 22 and therefore the endless screw 24 in rotation which, in turn, imparts an axial translational motion, in a screwing direction, on the rod element 18, which, by sliding freely internally of the sleeve 25, will begin to return internally of the tubular body 22, gradually leaving the initial position of maximum opening.

By the action of the nut 30 on the sleeve 25 or directly on the bead breaking arm 7, the traction force will be transmitted from the rod element 18 to the bead breaking arm 7, which will therefore begin to gradually move towards the opposing surface 9 associated to the frame 2 of the tyre changing machine 1.

As illustrated in FIGS. 3 and 4, the control means 19 activatable by an operator can comprise a Bowden cable 12 connected to a movable block B, which can also have a cam shape, solidly constrained to the base of the lever L. By rotating the lever L in the clockwise direction, the Bowden cable 12 is pulled, which causes the decoupling of the drive selector device 14 from the first pulley 15 and the coupling thereof with the second pulley 16, so as to transmit drive to the bead breaking arm.

The movable block B located at the base of the lever L can also be provided with a button device, for example of the microswitch type (not illustrated in the figures) which is activated by the rotation of the block B and which can be configured so as to send a switching-on command to the electric motor 10.

The electric motor 10 can alternatively be activated by means of a button (not illustrated in the figures), for example located in proximity of the handle M of the lever L.

Once the operator has chosen, for example using the lever L, whether to use the electric motor 10 for activating the wheel support assembly 6 or the bead breaking arm 7, the transmission of drive from the first pulley 15 to the wheel support assembly 6 or from the second pulley 16 to the bead breaking arm 7 is lastly realised by use of the first and/or second transmission belts 210, 220.

With reference to FIG. 7, the Bowden cable 12 operatively connects the lever L to a control and stop element 13 having a shape of a connecting bracket, which is mounted at a first end of a control rod 17 connected at a second end thereof to the drive selector device 14.

In this way, by acting on the lever L the control and stop element 13 displaces, which in turn displaces the drive selector device via the control rod 17.

The control and stop element 13 is in turn connected to the means for transmitting drive from the electric motor 10 to the bead breaking arm 7, as illustrated in FIG. 7. In fact, the terminal part of the control and stop element 13 is sleeve-shaped and extends about the rod element 18.

The control and stop element 13 is configured for automatically assuming, when the bead breaking arm 7 is in the disengaged position i.e. the maximum opening position, a rest position, in which it is ready to be subjected to the pulling action of the Bowden cable, and it is further substantially displaced towards the right, i.e. into the distal position with respect to the tubular body 22, so as to cause the drive selector device 14 to couple with the first pulley 15 and therefore transmit drive only to the wheel support assembly 6.

By means of the pulling action of the Bowden cable, the control and stop element 13 is configured so as to assume an operating position, in which it is substantially displaced towards the left (for example as illustrated in FIG. 7), so as to cause the drive selector device 14 to couple with the second pulley 16 and therefore transmit the drive only to the bead breaking arm 7.

Once the bead breaking arm has assumed the working position and has engaged on the bead of the tyre, the operator can impart a recall control into the disengaged position, inverting the rotation direction of the motor. When complete opening has been reached, in order to prevent an unexpected and undesired rotation of the wheel support assembly 6, the control and stop element 13 can be configured so as to act on a control device, for example of the microswitch type, for automatically controlling the switching-off of the motor on conclusion of the translational opening motion of the rod element. The microswitch device (not illustrated in the figures) can usefully be mounted solidly to the frame 2 of the tyre changing machine 1.

REFERENCE LIST 1 tyre changing machine
2 frame
3 support post
4 mounting/demounting means
5 mounting/demounting tool
A rest surface
6 wheel support assembly
R wheel
C rim
P tyre
7 bead breaking arm
7a intermediate arm
8 bead breaking tool
9 opposing surface
10 motor device, electric motor
11 selective drive transmission means
F control pedal
L control lever
B movable block
M handle
10a drive shaft
12 Bowden cable
13 control and stop element
17 control rod
14 drive selector device
141 selector element
142 control device
15 first pulley
16 second pulley
210 first belt
220 second belt
18 rod element
18a screw-shaped manoeuvring portion of the rod element
18b smooth portion of the rod element
19 control means activatable by an operator
20 support elements
21 pulley associated to the tubular body
22 tubular body
23 support tube
24 endless screw
25 connecting means
26, 27 pins
28, 29 slots
30 striker element
30 flange
300 means for setting in rotation the wheel support assembly
310 pulley associated to the wheel support assembly
320 shaft connected to the wheel support assembly
330 shaft

The invention claimed is:

1. A tyre changing machine comprising:
a frame restable on a rest surface;
a wheel support assembly for locking and rotating a rim of a wheel from which to demount or on which to mount a respective tyre, said wheel support assembly being mounted on the frame;
at least a bead breaking arm connected to the frame;
a bead breaking tool connected to said bead breaking arm and adapted to carry out a bead breaking operation of the tyre from the wheel, the bead breaking arm being movable between a disengaged position, wherein said bead breaking tool is distanced with respect to the tyre to be debeaded, and a working position, wherein said bead breaking tool can engage said tyre;
an electric motor having an output drive shaft for moving the bead breaking arm between the disengaged position and the working position; and
means for selectively transmitting drive from the electric motor to the bead breaking arm or to the wheel support assembly and adapted to selectively activate said bead breaking arm or said wheel support assembly;
the means for selectively transmitting the drive comprising:
exactly one drive selector device mounted on the electric motor drive shaft;
first drive transmission means mounted on the drive shaft on a first side of the drive selector device and adapted to transmit the drive to the wheel support assembly;
second drive transmission means mounted on the drive shaft on a second side of the drive selector device opposite the first side, and adapted to transmit the drive to the bead breaking arm;
a selector element mounted radially fixed and axially movable on and with respect to the drive shaft; and
a control device to axially translate the selector element along the drive shaft and respectively and alternatively enmesh either the first or the second drive transmission means:
wherein the drive selector device is adapted to be removably coupled to only the first drive transmission means to transmit the drive to the wheel support assembly, and removably coupled to only the second drive transmission means to transmit the drive to the bead breaking arm.

2. The tyre changing machine according to claim 1, wherein the first drive transmission means comprises a first pulley and respective first flexible members for drive transmission associated to said first pulley; and
wherein the second drive transmission means comprises a second pulley and respective second flexible members for drive transmission associated to said second pulley.

3. The tyre changing machine according to claim 1, wherein the first drive transmission means comprises a first cogwheel; and wherein the second drive transmission means comprises a control rod.

4. The tyre changing machine according to claim 1, wherein the control device is fork-shaped.

5. The tyre changing machine according to claim 1, wherein the means for selectively transmitting the drive is supported by the frame and comprises threaded means having an external screw thread and hollow counter-threaded means operatively coupled to said threaded means; and
  wherein the tyre changing machine further comprises connecting means for operatively connecting said means for selectively transmitting the drive to the bead breaking arm;
  said connecting means being adapted to slidably engage the means for selectively transmitting the drive to the bead breaking arm,
  said means for selectively transmitting the drive further comprising a striker element adapted to engage with at least one of the connecting means and the bead breaking arm.

6. The tyre changing machine according to claim 5, wherein said threaded means with an external screw-thread comprise a rod element having at least a screw-shaped manoeuvring first portion, and wherein said hollow counter-threaded means comprise a tubular body having a through-cavity comprising at least a nut-screw-shaped portion operatively coupled to the screw-shaped manoeuvring portion of the rod element.

7. The tyre changing machine according to claim 6, wherein the means for selectively transmitting the drive from the electric motor are adapted to activate in rotation the tubular body, internally of which the rod element is free to slide axially, in a screwing and an unscrewing direction.

8. The tyre changing machine according to claim 6, wherein the connecting means engages a second portion of the rod element.

9. The tyre changing machine according to claim 5, wherein the connecting means is hinged, by means of at least a pin, to the bead breaking aim.

10. The tyre changing machine according to claim 9, wherein the at least a pin is adapted to engage in a respective slot fashioned in the bead breaking arm.

11. The tyre changing machine according to claim 5, wherein the connecting means are hinged, by means of at least a first pin, to an intermediate connecting element, said intermediate connecting element being hinged, by means of at least a second pin, to the bead breaking arm.

12. The tyre changing machine according to claim 1, wherein the bead breaking tool is paddle-shaped or rotating disc-shaped.

\* \* \* \* \*